May 27, 1924.
H. A. WILSON
1,495,287
SUPPORT FOR VEHICLE LIGHTS
Filed May 17, 1923
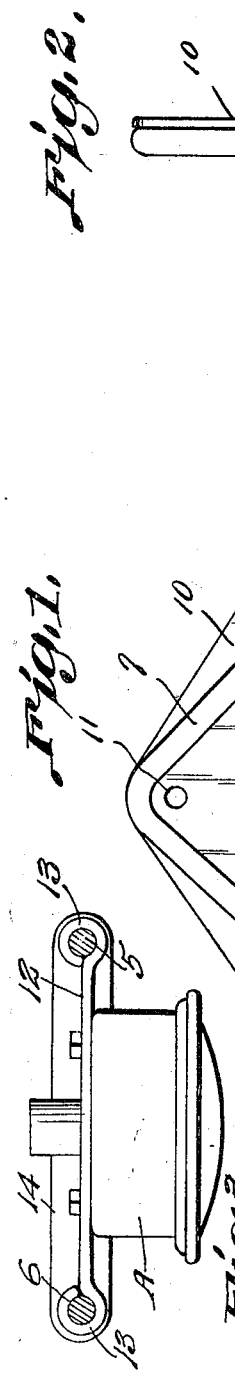
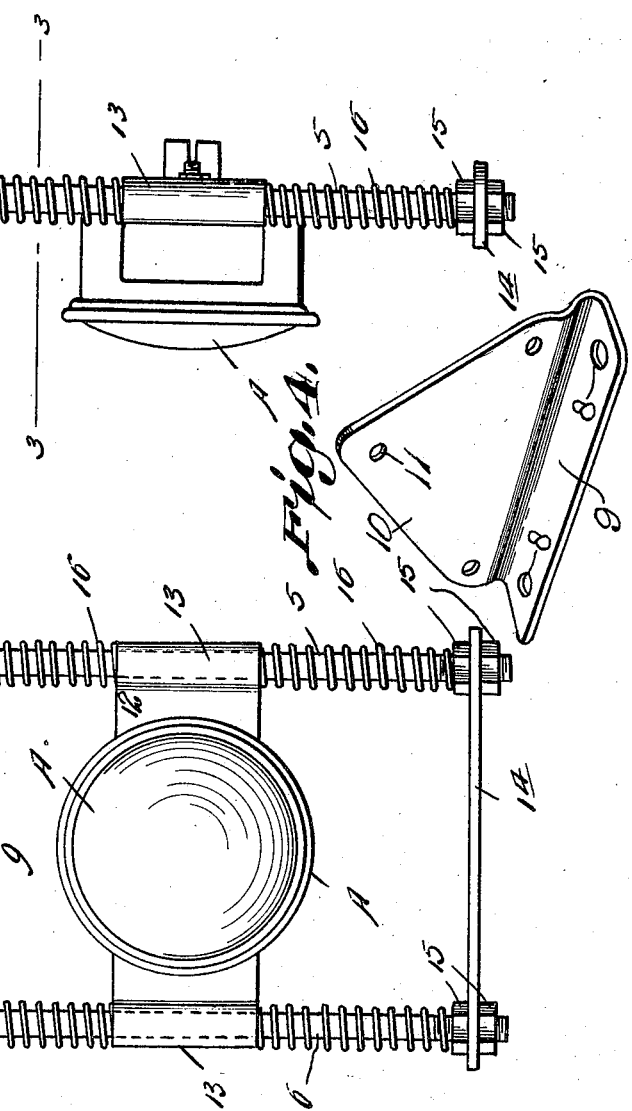
H. A. Wilson, Inventor
Attorney Patented May 27, 1924.

1,495,287

UNITED STATES PATENT OFFICE.

HERBERT A. WILSON, OF NEODESHA, KANSAS.

SUPPORT FOR VEHICLE LIGHTS.

Application filed May 17, 1923. Serial No. 639,531.

*To all whom it may concern:*

Be it known that I, HERBERT A. WILSON, a citizen of the United States, residing at Neodesha, in the county of Wilson and State of Kansas, have invented certain new and useful Improvements in Supports for Vehicle Lights, of which the following is a specification.

In carrying out the present invention, it is my purpose to provide a highly novel form of support for vehicle lights, and particularly the tail lights of motor vehicles, whereby the usual shocks and jars imparted to these lights incident to the operation of the vehicle will be fully taken up for thereby reducing to a minimum, the liability of the electric lamps from becoming broken.

The primary object of my invention resides in the provision of such a support that is comparatively simple of construction and inexpensive of manufacture, and one that is of such a nature as to be readily secured at any desired point of a motor or other vehicle.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 1 is a front elevation of my improved support, together with the vehicle tail light disposed thereon.

Figure 2 is a side elevation thereof.

Figure 3 is a detail cross section upon the line 3—3 of Figure 2, and

Figure 4 is a detail perspective view of the hanger bracket.

Referring to the drawings in detail, my improved support comprises a bar of circular cross section bent upon itself to provide a pair of vertically disposed separated legs 5 and 6 and substantially triangular shaped connecting portion 7. These legs 5 and 6 are adapted to be projected through openings 8 adjacent opposite ends of a forwardly directed flange 9 of a substantially triangular shaped bracket plate 10, this bracket plate being provided with openings 11 whereby the same may be secured to a convenient point of a vehicle, through the medium of bolts or the like.

The lamp designated A may be of any form desirable and is equipped upon its rear side with a cross relatively wide plate 12. As more clearly shown in Figure 3, the ends of this plate are looped upon themselves to provide tubular elements 13 that respectively engage over the said legs 5 and 6. The ends of these legs are screw threaded and have positioned thereon a cross flat like bar 14, this bar being maintained in adjustable position upon the said legs through the medium of nuts 15. Between opposite ends of the tubes 13 and the nuts 15 and flange 9 of the triangular plate 10 respectively, and surrounding the legs 5 and 6 are coiled springs 16, for thereby providing a floating support for the lamp A.

The bracket 10 which is adapted to be secured to the vehicle forms a hanger bracket for the remaining structure of the lamp support and slidably receives the ends 5 and 6 in the openings 8 which are normally held in a predetermined position relative to said hanger bracket through the cooperation of the springs 16 above and below the looped ends 13 of the plate 12 which abut at their lower ends against the nut 15 securing the plate 14 in place and at the upper ends against the flange 9 of the hanger brackets. This provides for an exceedingly resilient and cushioned support for the lamp A through the brackets or plates 12 having a relative movement on the rod portions 5 and 6 together with the slidable movement of these rods in the plate 10 in which it is adapted for relative movement cushioned by the springs 16.

In view of the above description, it will at once be apparent that I have provided a highly novel form of support for vehicle lights, and one that will answer the purposes above ascribed, and even though I have herein shown the preferred embodiment of the present invention, it is nevertheless to be understood that minor changes may be made therein, without departing from the spirit and scope of the invention as claimed.

Having thus described my invention, what I claim as new, and desire to secure by Letters-Patent, is:

A vehicle lamp support including a hanger bracket formed of a plate having a laterally extending flange at the lower end provided with a pair of spaced openings said plate being adapted for attachment to a vehicle, a bar member formed with a central bend to provide spaced parallel end portions adapted for slidable engagement in the spaced openings in said flange of the hanger bracket, a lamp carrying plate having the end portions formed into loops to slidably mount said lamp carrying plate on and between the parallel ends of said bar member, a cross bar having openings in the end portion for receiving the ends of said bar members, means for adjustably securing said cross bar on the ends of said bar member, and resilient means mounted on the ends of said bar member between the flange on the hanger brackets, the cross bar, and the lamp carrying plate mounted on the ends of said bar member for resiliently supporting said lamp carrying plate relative to said hanger bracket whereby the adjustment of the cross plate may be effected for adjusting the tension of said resilient means and the slidable mounting of the bar member in the lateral flange of said hanger bracket permits relative movement of the bar member therein.

In testimony whereof I affix my signature.

HERBERT A. WILSON.